(12) United States Patent
Lai

(10) Patent No.: US 9,734,712 B1
(45) Date of Patent: Aug. 15, 2017

(54) SYSTEMS AND METHODS FOR DETERMINING A POSITION OF A VEHICLE BASED ON INFORMATION COLLECTED BY COMMUNICATIONS EQUIPMENT ALONG A KNOWN ROUTE

(71) Applicant: ROCKWELL COLLINS, INC., Cedar Rapids, IA (US)

(72) Inventor: Tom Lai, Los Angeles, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/231,721

(22) Filed: Mar. 31, 2014

(51) Int. Cl.
*G08G 1/00* (2006.01)
*G01C 21/00* (2006.01)
*G08G 1/127* (2006.01)
*G01C 21/34* (2006.01)

(52) U.S. Cl.
CPC .............. *G08G 1/127* (2013.01); *G01C 21/34* (2013.01)

(58) Field of Classification Search
None
See application file for complete search history.

(56) References Cited

U.S. PATENT DOCUMENTS

| | | | | |
|---|---|---|---|---|
| 5,900,825 A | * | 5/1999 | Pressel | G01C 21/3629 340/905 |
| 2001/0014845 A1 | * | 8/2001 | Minowa | A61B 3/032 701/84 |
| 2005/0178632 A1 | * | 8/2005 | Ross | B60L 5/005 191/10 |
| 2012/0264447 A1 | * | 10/2012 | Rieger, III | G01S 5/0252 455/456.1 |
| 2014/0046585 A1 | * | 2/2014 | Morris, IV | G01C 21/00 701/468 |
| 2014/0365096 A1 | * | 12/2014 | Cooper | B60T 7/18 701/70 |
| 2015/0314789 A1 | * | 11/2015 | Roos | B60W 50/14 701/123 |

\* cited by examiner

*Primary Examiner* — Rami Khatib
*Assistant Examiner* — Gerrad A Foster
(74) *Attorney, Agent, or Firm* — Angel N. Gerdzhikov; Donna P. Suchy; Daniel M. Barbieri

(57) ABSTRACT

A system and method are provided for determining a position of a vehicle traversing a constrained path via cooperating communications equipment installed at fixed points along a known route and onboard the vehicle. The disclosed schemes leverage certain commonly-installed communications nodes to provide positioning information for participating vehicles when those vehicles are specifically limited in their movement to a particular path, including a train track. Signal analysis between cooperating nodes provides localization information, including timing information, that is sufficient, given the physical constraints of the participating vehicles to a particular track, lane or the like, to quickly resolve a positional localization for the vehicles. Common wireless transceiver connectivity is used to support a backup position locating system that has an appropriate fidelity to provide a required modicum of safety without stopping movement of all vehicles in a vicinity of a particular location with which other communications may have broken down.

10 Claims, 3 Drawing Sheets

SYSTEMS AND METHODS FOR DETERMINING A POSITION OF A VEHICLE BASED ON INFORMATION COLLECTED BY COMMUNICATIONS EQUIPMENT ALONG A KNOWN ROUTE

BACKGROUND

1. Field of the Disclosed Embodiments

This disclosure relates to systems and methods for determining a position of a vehicle traversing a constrained path via environmental information from, and collected by, communications equipment installed both at fixed points along a known route and onboard the traveling constrained path vehicle and communications established between the fixed and moving components of the system.

2. Related Art

Various techniques exist for localizing positions of moving vehicles and other moving objects/bodies. Among these techniques are the increasing uses of handheld, or vehicle mounted position keeping devices, and/or implementation of automatic vehicle locators (AVLs). An AVL system, for example, generally includes Global Positioning System (GPS) locators mounted on, for example, the tops of individual vehicles, including busses and trains. The individual locator components provide inputs to a local communication network, such as a cellular, Wi-Fi or other like network that provides adequate communication coverage. In this manner, positional information signals are generated by the AVL GPS system on or in the individual vehicles that are in turn transmitted to some central location (back-office) to centrally track vehicle locations generally at all times.

AVL systems are more commonly adapted to busses, which more generally operate in an open-air GPS-accessible environment than do, for example, trains. Coincidentally, there is generally understood to be a greater need for individual tracking of busses over trains in that trains (1) are generally much more constrained with regard to their movement i.e. on their tracks, and (2) are generally considered to be most often operating "on [or nearly on] schedule."

GPS-centric AVL systems are well known, but these systems tend to be proprietary to particular vendors. These AVL systems also may not be particularly adaptable to trains based on an amount of time that a train may spend out of an environment in which GPS localization is available.

Those of skill in the art also recognize that GPS localization, cellular (3 point) localization and other typical forms of individual, vehicle, or unit localization, require significant computing overhead based on a need to resolve a location of the individual, vehicle or unit in three axes (latitude, longitude and altitude/height).

Typically, because trains and other constrained-path vehicles are limited in their freedom of movement, advanced technology systems for resolving positions of the trains and/or other constrained-path vehicles may be considered wasteful, i.e., not cost effective based on the need for extensive supporting computer overhead. This is the reason why, particularly for trains, locating systems tend to be based on much more "low-technology" solutions. Any number of conventional methods may be used to localize a position, or a track occupancy, of a vehicle, particularly a train, when constrained to physical movement along a specified track.

The low-tech solutions for position monitoring of trains include axle counters at a beginning and an end of a particular track section. Information from the track axle counters may be transmitted to a central control location that maintains often a dynamic visual overview specifying a status of a section of track as occupied or non-occupied. Comparison is made between the number of axles in and the number of axles out of the particular section to confirm occupancy or non-occupancy. Track wayside control (TWC) loops are also or otherwise used to provide essentially the same information to the central control location for other sections of track. These are magnetized loops that detect a train in proximity or passing across those loops. Shunting is also used is in certain circumstances and is a mechanism by which a small electrical current is run through one track in a particular section and grounded to the other track through the metal wheels and axles. This shunting can be detected as the occupancy metric and forwarded to the central control location as well. Such redundant systems are emplaced and their use is warranted to ensure safety, which is paramount.

SUMMARY OF THE DISCLOSED SUBJECT MATTER

Existing methods of positively identify positions of a vehicle along a known route, for example, a rail track, are subject to failure. Examples of situations that cause failures include flooding and corrosion of track wayside loops, failures to acquire GPS locks along routes with poor visibility to overhead satellite constellations, deliberate tampering with systems (including axle counters) and other like difficulties. It would be advantageous, therefore, to provide multiple overlays for vehicle position keeping in an effort to reduce an effect of any particular failure involving any particular single method for identifying a position of a vehicle, including a train. Advantageous employment results may include advanced signaling, facilitating routing adjustment, overall safety and providing passenger information. Explicitly installing equipment for each of these purposes, however, regardless of the effectiveness of the equipment, would likely be deemed prohibitively expensive. An ability to leverage existing equipment installations or deploying equipment for multiple purposes may provide a solution in increasing coverage while decreasing costs to users and operating entities.

In the absence of an AVL system, and understanding the real-world constraints on other tracking systems, including potential failure, it may be advantageous to employ other modern technologies to be adaptable to trains, or other vehicles that may be generally physically constrained in their movement to a particular track, path, or the like, to provide redundant position locating capability in an effort to enhance safety, including safe vehicle separation.

With trains on a track, given a particularly resolved latitude and/or longitude, a reduction in computing overhead may be realized to localize the position of the train. This is because in a coarse sense the position may be generally localized according to the fixed positional requirements imposed by the physical structure of the tracks. Unless, a track loops back on itself, it is reasonable to conclude, with very limited positional localization/isolation information, that am externally-finely resolved position of the vehicle may not be necessary, or even appropriate, in three dimensions based on the physical constraints of the travel lane/ track for the vehicle.

Exemplary embodiments of the disclosed systems and methods may leverage certain commonly-installed communications nodes to provide redundantly available positioning information for participating vehicles when those participating vehicles are specifically limited in their movement to a particular path, including a train track.

Exemplary embodiments may provide additional localization information including, for example, timing information that may be sufficient, given the physical constraints of the participating vehicles to a particular track, lane or the like, to quickly resolve a fairly precise positional localization for the vehicles.

Exemplary embodiments may provide for a train on a track, a bus on a bus way, a monorail on its track, or even particular autonomous or semi-independent vehicles or bodies that are constrained in their flexibility of travel to a limited number of paths, i.e., any situation in which movement is fairly significantly restricted to a particular path (fixed-path vehicle), a particular scheme within which a low overhead to localization may be undertaken with limited additional information such as, for example, that which may be provided by limitedly-localized Wi-Fi communication between a vehicle-mounted transceiver and a station-mounted (or other fixed point-mounted) transceiver.

Exemplary embodiments may leverage common wireless transceiver connectivity capability supporting other non-dedicated communication schemes to provide at least a backup position locating system with an appropriate fidelity to provide the required modicum of safety without stopping movement of all vehicles in a vicinity of a particular location with which other communications, i.e., with dedicated position locating systems, may have broken down.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for determining a position of a constrained path vehicle via environmental information from, and collected by, communications equipment installed both at fixed points along a known route and onboard the traveling constrained path vehicle, will be described, in detail, with reference to the following drawings, in which.

DESCRIPTION OF THE DISCLOSED EMBODIMENTS

Figure 1:
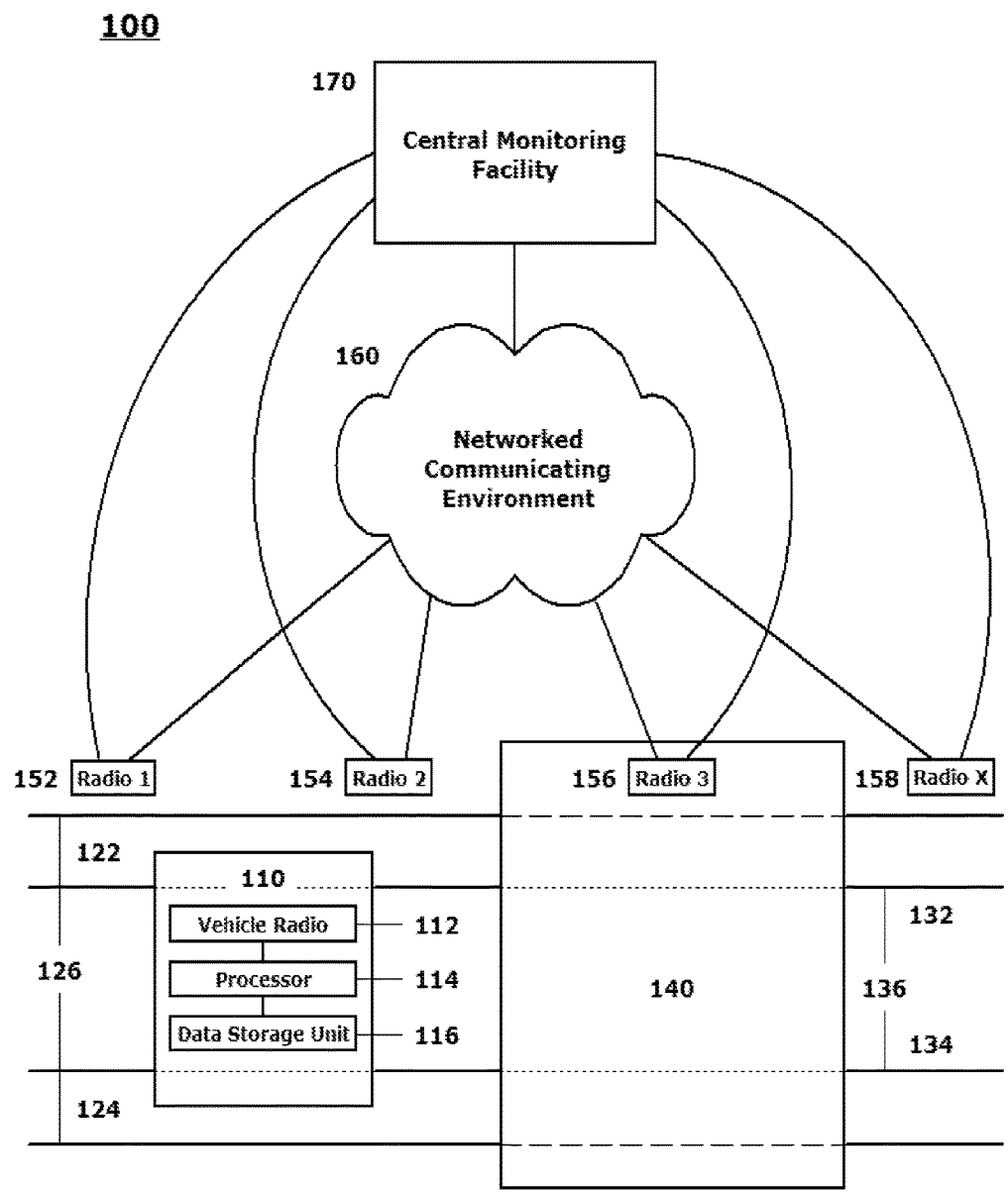
FIG. 1 illustrates an exemplary overview of an operating environment in which vehicle location schemes for constrained movement vehicles may be implemented according to this disclosure.

The disclosed systems and methods for determining a position of a constrained path vehicle via environmental information from, and collected by, communications equipment installed both at fixed points along a known route and onboard the traveling constrained path vehicle, will generally refer to this specific utility for those systems and methods. Exemplary embodiments will be described and depicted in this disclosure as being particularly adaptable to use on trains whose range of movement is, of course, restricted to movement along a train track. These descriptions and depictions should not be interpreted as specifically limiting the disclosed schemes to any particular configuration of a moving vehicle. In fact, the systems and methods according to this disclosure may be equally applicable to movements of vehicles, bodies, units and individuals where those movements are particularly constrained to a defined pathway or pattern of pathways. Any ability to augment a vehicle, body, unit or individual with an appropriate communicating device for establishing communications that may be used for localization individually with a series of corresponding fixed communicating devices in locations along the defined pathway is contemplated.

Specific reference to, for example, any particular wireless communicating component and/or any particular wireless communication protocol presented in this disclosure should be understood as being exemplary only, and not limiting, in any manner, to any particular class wireless communicating devices as those terms are understood by those of skill in the art, or to any particular communication link or protocol.

Features and advantages of the disclosed embodiments will be set forth in the description which follows, and in part will be obvious from the description, or may be learned by practice of the disclosed embodiments. The features and advantages of the disclosed embodiments may be realized and obtained by means of the instruments and combinations of features particularly pointed out in the appended claims.

Various embodiments of the disclosed embodiments are discussed in detail below. While specific implementations are discussed, it should be understood that this is done for illustration purposes only. A person skilled in the relevant art will recognize that other components and configurations may be used without departing from the spirit and scope of the disclosed embodiments Exemplary embodiments focus on modern wireless communicating technologies that may be available to replace or to supplement conventional geo-locating means for moving vehicles, including GPS-centric locating systems for the vehicles. In embodiments, information regarding a position of a vehicle may be provided to a specified central monitoring facility tracking a particular location of one or more vehicles monitored by the disclosed system in order to manage schedules, provide deconfliction, and generally oversee movement of the vehicles along particular pathways or throughout a pattern of pathways. In embodiments, the disclosed schemes may be used to, for example, predict when a train is going arrive at a particular station, or to isolate where a train is in the railway system at any particular point in time.

Exemplary embodiments may leverage a widespread proliferation of Wi-Fi-type wireless communicating devices including, for example, Wi-Fi base stations that may be varyingly mounted in fixed locations, including train stations, and separately and correspondingly located in all types of vehicles. In a simplest context, the disclosed schemes anticipate that Wi-Fi radios in vehicles, each with a particular radio identifier, may establish single-point short range communication with one or more fixed Wi-Fi stations at known positions such as, for example, in train stations, to localize a position of the vehicle with respect to the one or more fixed Wi-Fi stations with which the Wi-Fi radio in the vehicle may be communicating at any particular time.

With the availability of commercial and consumer grade wireless systems, transceiver information can be combined with non-positional data to heuristically generate a locus of track occupancy to refine positioning in the event of the failure of the traditional positioning systems that support vehicle localization. Further refinements of vehicle position may be available based on information gathered from the vehicle including, but not limited to, known or estimated positions, speed, heading and/or distance traveled. In embodiments, the disclosed system may be rely on explicitly defined points, or otherwise use heuristic or learning algorithms based on history and known good positions (which may come from operator input or reliance on other positioning systems for correlation) to continually refine an environmental map that may overly a series of patterned pathways for future positional searching.

The disclosed systems are distinguished from other electronic mapping systems that create maps of known Wi-Fi transceivers and their relative GPS positions based on data collected from surveys. These other electronic mapping systems are unconstrained in their use and do not readily interact with known information about vehicles in a system with known constrained pathways, e.g., track/route layouts. With a known track/route, especially in systems where Wi-Fi transceivers and other types of radio and wireless transceivers are already in service supporting other applications, integration with an operator controlled, or at least operator mediated, control or dispatch system may provide a platform for further refinement of vehicle positions including refinement through a learning algorithm.

The disclosed schemes recognize that Wi-Fi connectivity alone may not resolve positions of vehicles that travel in a fairly unconstrained manner to a level of fidelity required to pinpoint location of the vehicle in support of, for example, safe separation. The disclosed schemes leverage the widespread proliferation of wireless communicating devices that may be associated with fixed locations in a patterned environment and a low cost of installing corresponding wireless devices in vehicles, where such devices are not already installed to other purposes, to provide a mechanism by which to resolve vehicle locations in support of safe separation based on a knowledge of the movements of the vehicle being constrained to limited paths of movement within the patterned environment.

The disclosed embodiments may be particularly adaptable to installation in trains where transceivers on board the train have unique identifiers and transceivers installed in the train stations, or at other fixed locations along a particular track or path, may have unique identifiers as one identifying characteristic for each of the transceivers. Connectivity between vehicle-mounted transceivers and fixed-location transceivers may include identification of the nodes and signal strength resolution to support a scheme by which a position of the vehicle may be localized, when the constraints on vehicle movement are taken into account.

The disclosed systems may use individually-coupled transceivers as transponders. In other words, individual transceivers may be deployed in the vehicles and at fixed locations along a particular vehicle path and may provide an opportunity to localize, to a certain granularity, a proximity of the vehicle (via a mounted transceiver) to a particular fixed location. The linear constraints provided by conformance with a particular path provide a narrowing criterion within which a position of the vehicle is then localized.

The disclosed schemes may be usable to supplement or augment the position keeping requirements of advanced automated control systems such as Positive Train Control or PTC. PTC is a system of functional requirements for monitoring and controlling train movements to provide increased safety. PTC is intended to provide train separation and/or collision avoidance and line speed enforcement, including with regard to temporary speed restrictions, to increase safety, including the safety of wayside rail workers. In PTC, the train receives information about its own location and where it is allowed to safely travel, known in the industry as movement authorities. Equipment on board the train then may autonomously enforce these movement authorities in a manner that may prevent unsafe movement of the train, even, or particularly, in situations in which the engineer does not act. PTC uses a speed display and control unit on the locomotive, and executes a scheme to dynamically inform the speed display and control unit of changing track or signal conditions. An on-board navigation system and track profile database enforces fixed speed limits, a bi-directional data link informs signaling equipment of the train's presence, and a centralized systems issue updated movement authorities to the trains. PTC equipment on board the locomotive continually calculates the trains' current speed relative to a speed target some distance away governed by a braking curve. If the train risks not being able to slow to the speed target given the braking curve, the brakes are automatically applied and the train is immediately slowed. The speed targets are updated by information regarding fixed and dynamic speed limits determined by the track profile and signaling systems. Temporary speed restrictions can be updated before the train departs its terminal or via wireless data links when the train is enroute.

Individual lower fidelity communication capabilities may be used to localize a position of the vehicle because the vehicle is traveling on a constrained path. A known map of the fixed transceiver sites is used, along with discrete identifiers used to identify each of the individual fixed transceiver sites.

The disclosed schemes advantageously employ lower cost and coincidently lower fidelity, communication and localization systems to provide a system for localization redundancy throughout the constrained vehicle transportation system. Particularly when other system outages occur, the disclosed systems may be employed as a low cost back-up making use of available "other" technology localizing systems. A section of track of that is failed may be marked. Different procedures may then be undertaken to determine whether a train is going through that particular area with the failed track section.

It is recognized that generally the use of lower fidelity localization techniques may lead individually to a greater uncertainty. This uncertainty is managed in the disclosed scenarios based on the constrained movement of the vehicle along the restricted path. Comparison can be made to update locations when information is available from higher fidelity conventional systems as part of the learning scheme. The disclosed system may have a capacity to compare detected positions among the lower fidelity communications transceivers with otherwise "known" positions to provide that learning capability that may be usable to increase fidelity based on redundancy of operations in a particular area.

A transceiver on a train may ping a number of fixed site beacons as the constrained path is traveled over and over. The train knows roughly where it is based on the communications such that when the primary system is lost, users and user entities are not required to devolve to guesswork, but rather localization based on the backup system is provided. Positive confirmation may be provided as well via the involved, or other, communication means. Having a backup occupancy system associated with the trains themselves may update a positional fidelity based on redundantly traversing a known path past a series of known fixed transceivers on a regular basis. In this manner, the disclosed schemes reduce potentially labor-intensive requirement of sending a live technician to a position corresponding to a particular route, i.e., section of track, which may be inaccurately reporting closure based on an improperly reported positional sensing of the vehicle (train).

Deconfliction information may be collected at either of the centralized monitoring facility overseeing the pattern of available paths, or may be resolved locally within the vehicle in order to make appropriate adjustments to positional deconfliction of a first vehicle with respect to a second vehicle along one of the paths in the patterned path structure. The deconfliction may be required with regard to a particular path in the patterned path structure that is obstructed for other, potentially scheduled, reasons including, for example, maintenance. The decision-making process as to any path deviation or adjustment may occur at the centralized monitoring facility, or it may occur within the vehicle itself based on information provided, for example, by the centralized monitoring facility.

FIG. 1 illustrates an exemplary overview of an operating environment 100 in which vehicle location schemes for constrained movement vehicles may be implemented according to this disclosure. As shown in FIG. 1, the exemplary operating environment 100 is intended to follow the operations of one or more vehicles 110 constrained to operations along at least one of (1) a constrained path 126 with boundaries 122 and 124 or (2) a track 136 with rails 132 and 134. This depiction is not intended, in any way, to exclude other constructs, including monorails and other like movement restricting paths.

Each vehicle 110 may include a vehicle radio 112, which may be any wireless device installed in, mounted on, or otherwise associated with, the vehicle 110 for communicating with a plurality of trackside or path-side fixed radio installations 152,154,156,158, including fixed radio installations in one or more stations 140. The vehicle radio 112 may be configured to communicate, via a wired or wireless connection within the vehicle 110.

A vehicle radio 112 in each of the vehicles 110 may be configured to cooperatively communicate sequentially with each of the trackside or path-side fixed radio installations 152,154,156,158 as the vehicle 110 passes each of those installations. The each vehicle radio 112 and the each of the trackside or path-side fixed radio installations 152,154,156, 158 may be configured as a wireless access point. The each of the trackside or path-side fixed radio installations 152, 154,156,158 may be arranged at fixed (known) locations along the track or path. The each vehicle radio 112 and the each of the trackside or path-side fixed radio installations 152,154,156,158 may be encoded with a known unique identifier such that, when communications are established between one or more of the vehicle radio(s) 112 and the fixed radio installations 152,154,156,158, these communications may provide a method for determining a position of the vehicle 110. These communications may be used at least as a fallback method for determining the locus of vehicle occupancy in the event that the normal methods for such determinations fail due to one or more of environmental and technical factors.

The communications may be according to a Wi-Fi or WiGig protocol, or any other like communication protocol, that may establish a handshake between the vehicle radio 112 and the fixed radio installations 152,154,156,158. Radio signal strength from one or more of the fixed radio installations 152,154,156,158 in communication with the vehicle radio 112 may be employed when acquired transceivers are in communication, with known latitude and longitude coarsely established based on the position of the vehicle 110 on the track or in the path, to triangulate a position of the vehicle 110 based on these communications.

Based on processing capacities of the system overall, a library of visible transceiver identities, and the relative signal strengths, may be used to create an environmental map over a pattern of paths. In instances in which the vehicle 110 is possibly located at known positions, for example, a track wayside loop, or at a station with a known latitude and longitude, the vehicle position may be reset to provide a new baseline for occupancy estimation based on the communications between the vehicle radio 112 and the fixed radio installations 152,154,156,158.

In the event that other methods of localizing a position of the vehicle 110 along the track or path may become unavailable, with knowledge that the movements of the vehicle 110 are constrained to progress along track or path, positional information may be discerned or inferred from existing track occupancy methods or may be explicitly set by a vehicle control system or by an operator. The information can be used to generate a starting point along the path for velocity and the heading of the vehicle, or can be used as a reset position enroute.

Communications may be established between the fixed radio installations 152,154,156,158 and a central monitoring facility 170. These communications may be wired or wireless and may be direct or via some manner of networked communicating environment 160. Establishment of communications between the vehicle radio 112 and the fixed radios 152,154,156,158, with the associated processing and/or triangulation of a localization of the vehicle 110 based on those communications, may be translated to the central monitoring facility 170. In instances where the vehicle radio 112, or other communicating systems in the vehicle 110, are in constant or sporadic contact with the central monitoring facility 170, and the vehicle radio 112 may be capable of relaying actual speed, heading and traveled distances, or an estimated speed, heading and travel distance (via, for example, inertial measurements). These parameters may be used to constrain a calculation of a position of the vehicle within the known pattern of paths established by the track or path structure. The capacity of the disclosed systems to accomplish this task effectively reduces the search space for calculating a locus of track or path occupancy within a known library of radio and/or positional signals.

By integrating the above systems and/or schemes from the heuristically applied learning algorithm, which is capable of storing a history of movements of the vehicle 110, and comparing estimated occupancy with actual reported occupancy of a suitably high confidence, the exemplary system 100 can be made to be self-healing in the event that environmental indicators fail and/or are replaced. This latter instance may occur in a case where a station transceiver is replaced with a transceiver having a previously unused identifier. Alternatively, the system 100 may be configured to require explicit information on additional station and/or other fixed location transceivers with at least initial positional data and/or identity data being provided to ensure that, for example, external sources of transceiver information may not be used in some manner that may overwhelm a calculation or triangulation of existing known positional fixes. A preferable balance may integrate both in order to reduce vulnerability to "spoofing" of positional sources. Those of skill in the art will recognize that, for example, jamming of positional sources may be a problem for non-spread-spectrum transceivers.

By providing fallback information, along with the collected environmental information, the disclosed systems and methods may allow a more robust method for maintaining environmental and positional awareness for vehicles within a known path structure as those vehicles travel along one or more known tracks or paths.

Figure 2:
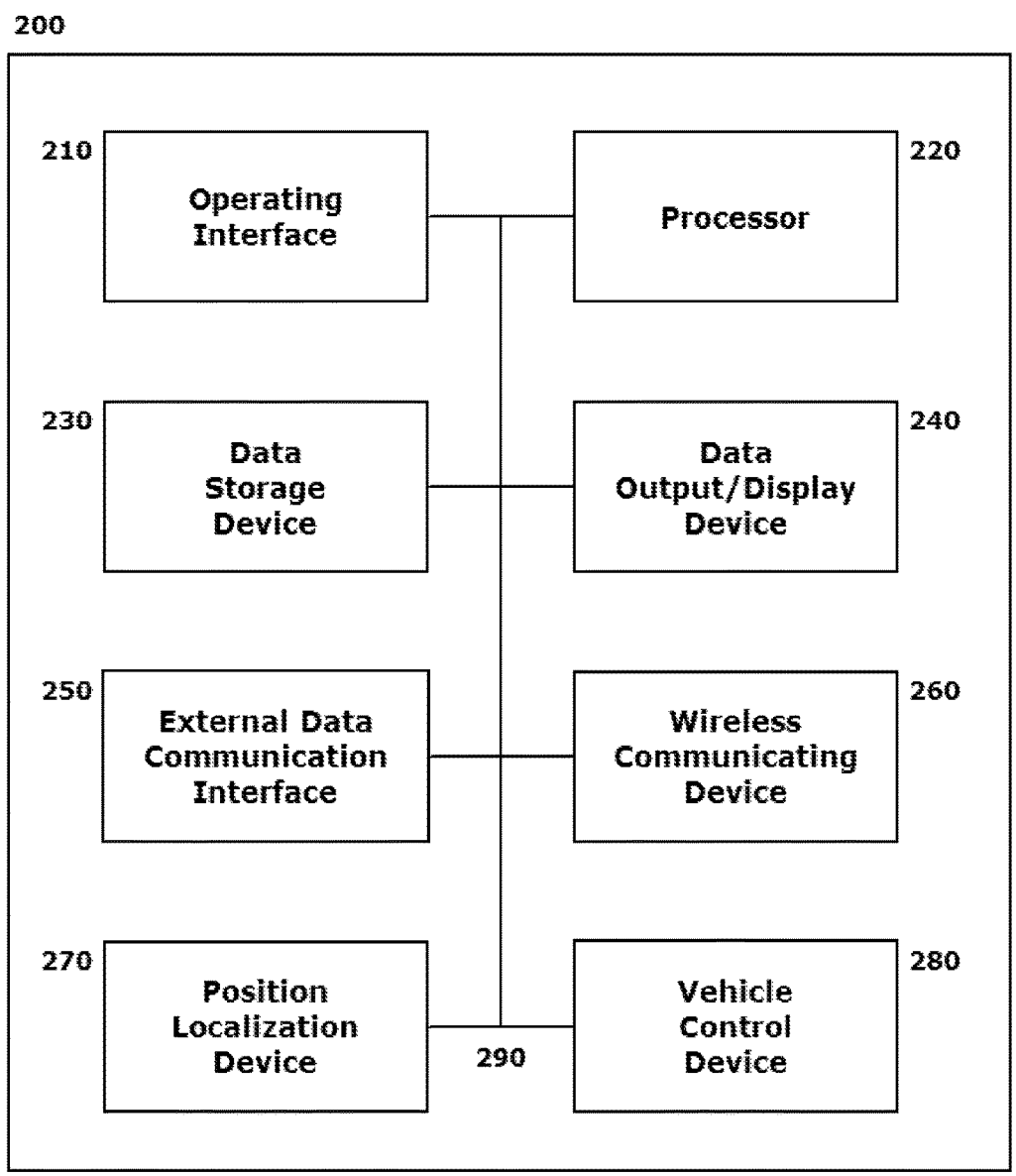
FIG. 2 illustrates an exemplary communication and control system that may implement a vehicle location scheme for constrained movement vehicles according to this disclosure.

FIG. 2 illustrates an exemplary communication and control system 200 that may implement a vehicle location scheme for constrained movement vehicles according to this disclosure. The exemplary control system 200 shown in FIG. 2 may be implemented as a unit in the vehicle 110, or may be implemented as a combination of system components dispersed between a vehicle 110 and a central monitoring facility 170.

The exemplary communication and control system 200 may include an operating interface 210 by which a user may communicate with the exemplary communication and control system 200 for directing at least a mode of operation of a vehicle localization scheme, a vehicle location verification scheme or a vehicle control scheme based on localization information. Control inputs received in the exemplary communication and control system 200 via the operating interface 210 may be processed and communicated to the vehicle control systems, or a central monitoring facility for appropriate processing of location data, and other system operations based on resolution of the location data according to this disclosure. The operating interface 210 may be a part of a function of a graphical user interface (GUI) mounted on, integral to, or associated with, a control system for the vehicle with which the exemplary communication and control system 200 is associated to determine a localization of the vehicle on a path or track, and to execute control and communication inputs based on the localization of the vehicle.

The exemplary communication and control system 200 may include one or more local processors 220 for individually operating the exemplary communication and control system 200. The processor 220 may reference, for example, movement authorities for the vehicle that may be received from a remote source via an external data communication interface 250, or that may be stored locally in a data storage device 230. Processor(s) 220 may include at least one conventional processor or microprocessor that interprets and executes instructions to establish a position of the vehicle based on localized communications between a wireless communicating device 260 on the vehicle and one or more wireless communicating devices positioned at fixed locations along a track or path to which movement of the vehicle is restricted. Based on a resolved location, the processor 220 may execute certain of the vehicle control functions.

The exemplary communication and control system 200 may include one or more data storage devices 230. Such data storage device(s) 230 may be used to store data or operating programs to be used by the exemplary communication and control system 200, and specifically the processor(s) 220 in carrying into effect the disclosed functions. Data storage device(s) 230 may be used to store information regarding vehicle localization operations which may be executed by resolving point-to-point wireless communications including discerning received signal strengths between a vehicle mounted wireless communicating device 260 and the one or more fixed wireless communicating devices positioned along the track or path. Stored schemes may be used by the processor 220 to carry out the localization and control functions for the vehicle by the exemplary communication and control system 200.

The data storage device(s) 230 may include a random access memory (RAM) or another type of dynamic storage device that is capable of storing updatable database information, and for separately storing instructions for execution of system operations by, for example, processor(s) 220. Data storage device(s) 230 may also include a read-only memory (ROM), which may include a conventional ROM device or another type of static storage device that stores static information and instructions for processor(s) 220. Further, the data storage device(s) 230 may be integral to the exemplary communication and control system 200, or may be provided external to, and in wired or wireless communication with, the exemplary communication and control system 200, including cloud-based storage and/or processing elements.

The exemplary communication and control system 200 may include at least one data output/display device 240, which may be configured as one or more conventional mechanisms that output information to a user, including, but not limited to, a display screen on a GUI in the vehicle for displaying information regarding operation of the vehicle including, but not limited to, current speed and any upcoming speed restrictions that may require an adjustment of the current speed. The data output/display device 240 may be used to indicate operating conditions or modes of the vehicle localization and control functions that may be carried into effect by the exemplary communication and control system 200.

The exemplary communication and control system 200 may include at least one external data communication interface 250 by which the exemplary communication and control system 200 may communicate with external systems for effecting vehicle localization and control.

The exemplary communication and control system 200 may include a wireless communicating device 260. In instances where the exemplary communication and control system 200 is mounted completely or predominantly within a vehicle, the wireless communicating device 260 may be used to establish communication with one or more fixed sites along the track or path to which movement of the vehicle is constrained for localizing a position of the vehicle based on position triangulation with two fixed sites or received signal strength from one or more fixed sites. Each wireless communicating device 260, and each fixed communication device along the track or path, may have at least a unique identifier in order to facilitate localization based on communications between each wireless communicating device 260 and each fixed communication device along the track or path.

The exemplary communication and control system 200 may include a position localization device 270. The positional localization device 270 may be a function of the processor 220 in communication with the data storage device 230, or may be a stand-alone device or unit within the exemplary communication and control system 200. The position localization device 270 may be used to assess communications established between the wireless communicating device 260 and one or more fixed communication devices along the track or path, including assessing a strength of a communicating signal between communicating devices. The position localization device 270 may also include a learning function that may be usable to update/confirm a position of the vehicle based on some other location input including, but not limited to, a GPS position of the vehicle, a manual input from a user via the operating interface 210, a known vehicle location input from some other positioning device and the like. The learning function may reset a sensed position of the vehicle to a "known" position of the vehicle when such a known position is determined and provided, in any reasonable manner, to the exemplary communication and control system 200.

The exemplary communication and control system 200 may include a vehicle control device 280. The vehicle control device 280 may be a function of the processor 220 in communication with the data storage device 230, or may be a stand-alone device or unit within the exemplary communication and control system 200. When a standalone device or unit within the exemplary communication and control system 200, the vehicle control device 280 may itself reference information, including movement authorities for the vehicle along the track or path, which may be stored in the data storage device 230. The vehicle control device 280 may take inputs from the position localization device 270, reference a track or path pattern layout stored in the data storage device 230, along with the movement authorities for the vehicle, which may be stored in the data storage device 230, or may be received via the external data communication interface 250 from an outside source including a central monitoring facility. The vehicle control device 280 may be used to modify a speed of the vehicle based on a collection of these inputs. The vehicle control device 280, for example, may execute a braking scheme for the vehicle when it is determined that the vehicle may reach a particular portion of the track or path for which a current speed of the vehicle may be too high. A calculation of a position at which to commence such braking may be based on numerous available inputs including turn radius, track/path grade, environmental conditions, proximity of personnel that may be injured, proximity of property that may be damaged, current vehicle weight and other like conditions of the vehicle, track/path, or local natural and/or man-made environment. In embodiments, the vehicle control device 280 may consolidate localization and path pattern scheme inputs to control movement of the vehicle along the path, up to and including acting as a virtual autopilot for the vehicle along the path.

All of the various components of the exemplary communication and control system 200, as depicted in FIG. 2, may be connected internally, and potentially to a processing device such as, for example, in a central monitoring facility, by one or more data/control busses 290. These data/control busses 290 may provide wired or wireless communication between the various components of the exemplary communication and control system 200, whether all of those components are housed integrally in, or are otherwise external and connected to, other components of a localization system (including the central monitoring facility) with which the exemplary communication and control system 200 may be associated.

It should be appreciated that, although depicted in FIG. 2 as an essentially integral unit, the various disclosed elements of the exemplary communication and control system 200 may be arranged in any combination of sub-systems as individual components or combinations of components, integral to a single unit, or external to, and in wired or wireless communication with, the single unit of the exemplary communication and control system 200. In other words, no specific configuration as an integral unit or as a support unit is to be implied by the depiction in FIG. 2. Further, although depicted as individual units for ease of understanding of the details provided in this disclosure regarding the exemplary communication and control system 200, it should be understood that the described functions of any of the individually-depicted components may be undertaken, for example, by one or more processors 220 connected to, and in communication with, one or more data storage device(s) 230, all of which may support operations in the associated localization system.

Figure 3:
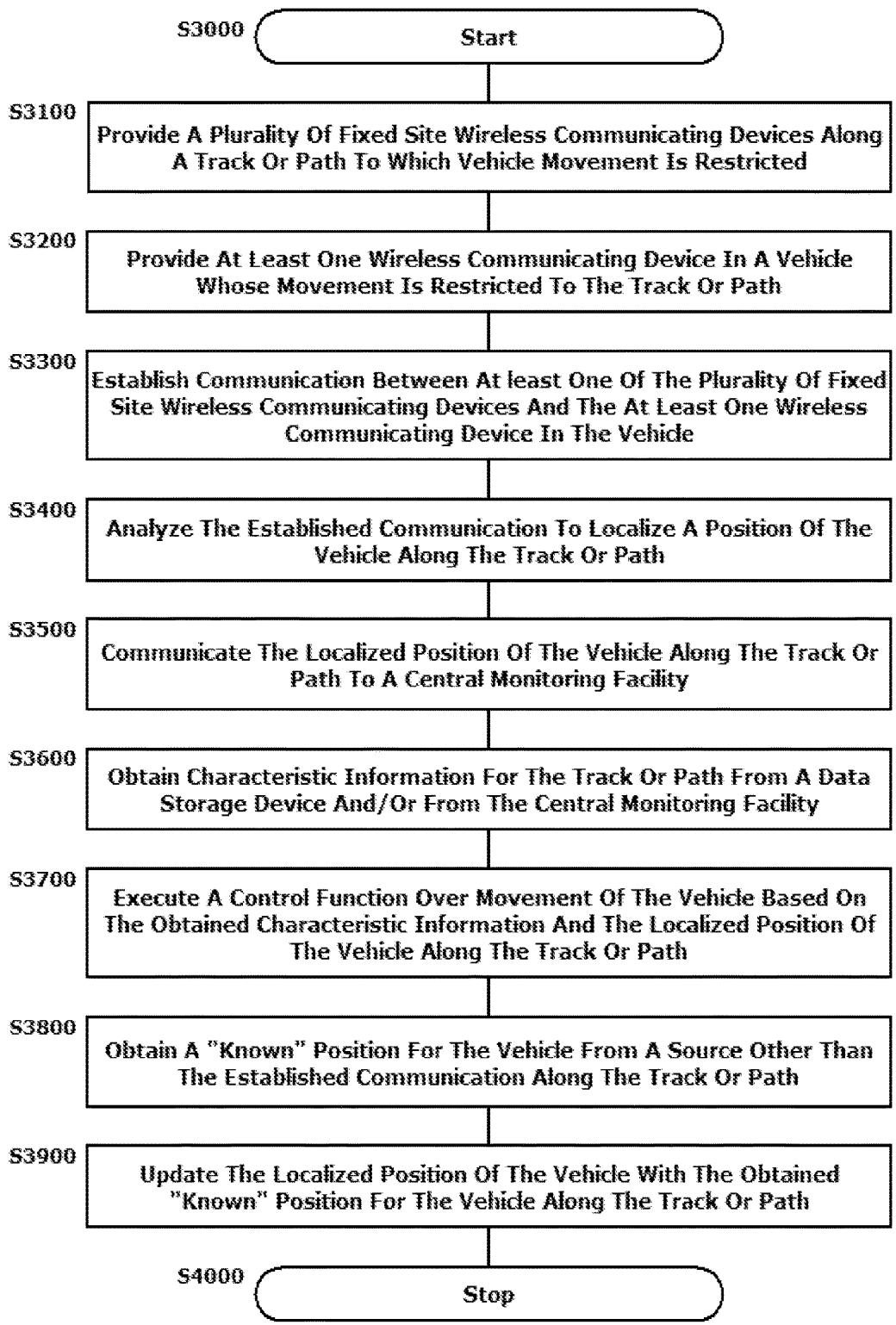
FIG. 3 illustrates a flowchart of an exemplary method for effecting a vehicle location scheme for constrained movement vehicles according to this disclosure.

The disclosed embodiments may include an exemplary method for effecting a vehicle location scheme for constrained movement vehicles. FIG. 3 illustrates an exemplary flowchart of such a method. As shown in FIG. 3, operation of the method commences at Step S3000 and proceeds to Step S3100.

In Step S3100, a plurality of fixed site wireless communicating devices may be provided along a track or path to which movement of a particular vehicle is restricted. Each of the plurality of fixed site wireless communicating devices having a unique identifier. Operation of the method proceeds to Step S3200.

In Step S3200, a wireless communicating device may be provided in the vehicle whose movement is restricted to the track or path. The wireless communicating device having a unique identifier. Operation of the method proceeds to Step S3300.

In Step S3300, communication may be established between at least one of the fixed site wireless communicating devices and the wireless communicating device in the vehicle. Operation of the method proceeds to Step S3400.

In Step S3400, the established communication between the two wireless communicating devices may be analyzed to localize a position of the vehicle along the track or path. The analysis may include an assessment of relative signal strengths for communications established between the communicating devices, and particular identification of the communicating devices based on the unique identifier for each device. Operation of the method proceeds to Step S3500.

In Step S3500, the localized position of the vehicle along the track or path may be communicated to a central monitoring facility. In the central monitoring facility, for example, the localized position of the vehicle may be represented in a visual manner on an overall situational awareness display that may display a pattern of individual restricted movement paths overseen by the central monitoring facility. Operation of the method proceeds to Step S3600.

In Step S3600, characteristic information for the track or path may be obtained from at least one of a data storage device or the central monitoring facility. The data storage device may be a local (in vehicle) or remote (external or cloud-based) data storage device. The characteristic information may include, for example: a grade of the track or path; radii of curves or corners in the track or path; proximities of people and property to the track or path; specific speed restrictions, permanent or temporary, along any section of the track or path; and other like information. The characteristic information may also include external environmental information including local weather conditions such as temperature, visibility, humidity, precipitation and the like. Operation of the method proceeds to Step S3700.

In Step S3700, a control function over movement of the vehicle may be executed based on the obtained characteristic information and the localized position of the vehicle along the track or path. The control function may be executed based on local processing completely within the vehicle, or may be executed based on processing within the vehicle of a characteristics analysis forwarded to the vehicle from the central monitoring facility, or may be executed according to control signals sent directly from the central monitoring facility based on processing of the characteristics analysis by the central monitoring facility. Operation of the method proceeds to Step S3800.

In Step S3800, a "known" position for the vehicle may be obtained from a source other than the establish communication along the track or path. Operation of the method proceeds to Step S3900.

In Step S3900, the localized position of the vehicle may be updated with the obtained "known" position for the vehicle along the track or path to provide a new, or reset, starting point or datum for further localization analysis and/or characteristics analysis as outlined above. Operation of the method proceeds to Step 45000, where operation of the method ceases.

The disclosed embodiments may include a non-transitory computer-readable medium storing instructions which, when executed by a processor, may cause the processor to execute all, or at least some, of the functions to implement the steps of the method outlined above.

The above-described exemplary systems and methods reference certain conventional components to provide a brief, general description of suitable operating environments in which the subject matter of this disclosure may be implemented for familiarity and ease of understanding. Although not required, embodiments of the disclosed systems, and implementations of the disclosed methods, may be provided and executed, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in integrating localization techniques for vehicles traveling on constrained tracks or paths using many and widely varied system components.

As indicated above, embodiments within the scope of this disclosure may also include computer-readable media having stored computer-executable instructions or data structures that can be accessed, read and executed by one or more processors in differing devices, as described. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 3, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual vehicle that may individually reliably employ components of the disclosed system or autonomous or system-wide vehicle localization. This enables each user vehicle to enjoy the benefits of the disclosed embodiments even if any one of the large number of possible user vehicle applications do not need some portion of the described functionality. In other words, there may be multiple instances of the disclosed system each processing the content in various possible ways. It does not necessarily need to be one system used by all end user vehicles. Accordingly, the appended claims and their legal equivalents should only define the disclosed embodiments, rather than any specific examples given.

I claim:

1. A system for localizing a position of a moving body, comprising:
    a plurality of first wireless communicating devices mounted at fixed locations along a path to which movement of a moving body is constrained;
    a second wireless communicating device associated with the moving body, the second wireless communicating device independently establishing communication sequentially with the plurality of first wireless communicating devices as the moving body traverses the path to which the movement of the moving body is constrained;
    a position resolution device that dynamically resolves a position of the moving body along the path to which the movement of the moving body is constrained;
    a storage device that stores path characteristic information; and
    a moving body control device that references the dynamically resolved position of the moving body, moving body movement parameters, and the stored path characteristic information to execute a control scheme to control moving body movement based on the referenced dynamically resolved position of the moving body, moving body movement parameters, and the stored path characteristic information,
    the stored path characteristic information including (1) a grade of the path, (2) radii of curves or corners in the path, and (3) locations of stations and other points along the path at which people congregate, the plurality of first wireless communicating devices and the second wireless communicating device each having a unique device identifier, the position resolution device being configured to dynamically resolve the position of the moving body along the path by assessing a signal strength of the established communication between the second wireless communicating device and at least two of the plurality of first wireless communicating devices, and the position resolution device being further configured to receive an input of known positioning data for the moving body, and to reset a position of the moving body to a known position and update the dynamically resolved position of the moving body with the input of the known positioning data, the input of the known positioning data including a manual input from a user or known moving body location input from another positioning source.

2. The system of claim 1, the dynamically resolved position of the moving body being transmitted to a separate monitoring facility.

3. The system of claim 1, the plurality of first wireless communicating devices and the second wireless communicating device being configured as wireless access points.

4. The system of claim 1, the second wireless communicating device establishing communication with the plurality of first wireless communicating devices according to one of a Wi-Fi or WiGig communication protocol.

5. The system of claim 1, the moving body being one of a train on a train track and a bus on a restricted bus way.

6. A method for localizing a position of a moving body whose movement is constrained to a specified path, comprising:

establishing communication sequentially between (1) each of a plurality of first wireless communicating devices mounted at fixed locations in sequence along a path to which movement of a moving body is constrained, and (2) a second wireless communicating device associated with the moving body, the communication being independently established sequentially between each of the plurality of first wireless communicating devices and the second wireless communicating device as the moving body traverses the path to which the movement of the moving body is constrained;

referencing a unique device identifier for each of the plurality of first wireless communicating devices to identify the fixed location of each of the plurality of first wireless communicating devices along the path;

dynamically resolving, with a processor, a position of the moving body along the path to the which the movement of the moving body is constrained;

receiving, with the processor, path characteristic information;

receiving, with the processor, moving body movement parameters;

determining, with the processor, a control input for moving body movement based on the dynamically resolved position of the moving body, the received moving body movement parameters, and the received path characteristic information;

directing, with the processor, execution of a control scheme implements the control input for the moving body movement;

receiving, with the processor, an input of known positioning data for the moving body from a separate source, the input of the known positioning data including a manual input from a user or known moving body location input from another positioning source; and resetting a position of the moving body to a known position and updating the dynamically resolved position of the moving body with the input of the known positioning data, the path characteristic information including (1) a grade of the path, (2) radii of curves or corners in the path, and (3) locations of stations and other points along the path at which people congregate, the position of the moving body along the path being dynamically resolved by assessing relative signal strengths of the communication established between at least two of the plurality of first wireless communicating devices and the second wireless communicating device.

7. The method of claim 6, further comprising transmitting the dynamically resolved position of the moving body to a separate monitoring facility.

8. The method of claim 6, the plurality of first wireless communicating devices and the second wireless communicating device being configured as wireless access points.

9. The method of claim 6, the communication being established according to one of a Wi-Fi or WiGig communication protocol.

10. A non-transitory computer readable medium on which is stored operating instructions that, when executed by a processor, cause the processor to execute the steps of a method for localizing a position of a moving body whose movement is constrained to a specified path, comprising:

establishing communication sequentially between (1) each of a plurality of first wireless communicating devices mounted at fixed locations in sequence along a path to which movement of a moving body is constrained, and (2) a second wireless communicating device associated with the moving body, the communication being independently established sequentially between each of the plurality of first wireless communicating devices and the second wireless communicating device as the moving body traverses the path to the which the movement of the moving body is constrained;

referencing a unique device identifier for each of the plurality of first wireless communicating devices to identify the fixed location of each of the plurality of first wireless communicating devices along the path;

dynamically resolving a position of the moving body along the path to the which the movement of the moving body is constrained;

receiving, with the processor, path characteristic information;

receiving, with the processor, moving body movement parameters;

determining, with the processor, a control input for moving body movement based on the dynamically resolved position of the moving body, the received moving body movement parameters, and the received path characteristic information;

directing, with the processor, execution of a control scheme implements the control input for the moving body movement, receiving an input of known positioning data for the moving body from a source other than the plurality of first wireless communicating devices during movement of the moving body on the specified path, the input of the known positioning data including a manual input from a user or known moving body location input from another positioning source; and resetting a position of the moving body to a known position and updating the instructions for dynamically resolving the position of the moving body based at least in part on the input of the known positioning data such that an accuracy of subsequent iterations of dynamically resolving the position of the moving body along the path is improved, the path characteristic information including (1) a grade of the path, (2) radii of curves or corners in the path, and (3) locations of stations and other points along the path at which people congregate, the position of the moving body along the path being dynamically resolved by assessing relative signal strengths of the communication established between at least two of the plurality of first wireless communicating devices and the second wireless communicating device.

* * * * *